United States Patent [19]

Lenkin

[11] Patent Number: 5,741,561
[45] Date of Patent: Apr. 21, 1998

US005741561A

[54] INTERCHANGEABLE EDUCATIONAL WRITING PAD

[75] Inventor: Alexa Lenkin, Bethesda, Md.

[73] Assignee: Alexa L. Smith, Arlington, Va.

[21] Appl. No.: 401,279

[22] Filed: Mar. 9, 1995

[51] Int. Cl.⁶ .................................................. G09B 1/00
[52] U.S. Cl. ...................... 428/13; 273/240; 273/430; 428/100; 434/347
[58] Field of Search .................. 428/13, 100; 273/240, 273/296, 430, DIG. 30; 434/347

[56] References Cited

U.S. PATENT DOCUMENTS

| | | | |
|---|---|---|---|
| 3,603,592 | 9/1971 | Bury | 273/240 |
| 3,739,070 | 6/1973 | Rosen et al. | 434/410 X |
| 3,920,870 | 11/1975 | Ackerman et al. | 428/46 |
| 3,983,277 | 9/1976 | Ackerman et al. | 428/46 |
| 4,231,174 | 11/1980 | Thompson | 40/10 |
| 4,944,968 | 7/1990 | Wagner | 428/13 |
| 5,047,267 | 9/1991 | Pantaleo et al. | 428/13 |
| 5,096,752 | 3/1992 | Wagner | 428/13 |
| 5,256,457 | 10/1993 | Pantaleo et al. | 428/13 |

*Primary Examiner*—Henry F. Epstein
*Attorney, Agent, or Firm*—Joseph Bach

[57] ABSTRACT

An interchangeable educational writing pad is disclosed. The writing pad includes a double walled vinyl placemat having an opening on one side thereof. The vinyl placemat is provided with a marker attachment. A series of printed paper inserts are provided. Each insert includes a problem printed on one side and its solution on the other. The inserts are labeled front and back so that the user may insert the insert with the front facing up, solve the problem, pull out and then flip the insert, and reinsert the insert to check the correct answer.

8 Claims, 2 Drawing Sheets

INTERCHANGEABLE EDUCATIONAL WRITING PAD

BACKGROUND OF THE INVENTION

1. Field of the Invention

The present invention relates to educational writing pads and, more specifically, to such writing pads which are erasable and interchangeable.

2. Description of Related Art

Several products on the market today are aimed at child development through written communication. For example, a coloring book allows for creative expression through written communication, while sharpening penmanship and artistic skills. However, once colored, a page cannot be reused. A related product is a question book where space is provided for the user to write in the answers to the presented questions. Again, once the answers are written, the book is generally not reusable.

Another example is a toy which allows a child to write on a board with a plastic pen-like stick, and lift an overlay to erase the previous sketch. This allows a child to repeatedly use the toy. However, such devices generally provide only one color. Also, such devices generally do not lend themselves well for a question-answer format.

Another example of a device which allows for repeated use is a learning mat. This product is a printed sheet of paper encased in a plastic lamination. The user is able to write on the plastic surface with a dry erase marker and thereafter wipe off the markings for repeated use. Such devices are also available for other uses, such as calendars, schedules, and the like. However, each particular learning mat has a fixed, specific content.

Although the above-mentioned devices are all useful products with individual special features, a need arises for one product which incorporates the advantages of all the above devices. Generally, the products which allow for the widest versatility in color, design choices and instruction (such as a coloring book) are usable only once. On the other hand, those which are usable repeatedly, limit the versatility of the product.

Accordingly, it is an object of the present invention to provide a device which provides for great versatility and choice of colors and designs, while allowing repeated use.

SUMMARY OF THE INVENTION

The writing pad of the present invention provides for a wide choice of design and colors, enables the incorporation of variety of instructions, and allows for repeated use over the same design.

The writing pad of the present invention is generally constructed of a plastic material, substantially in a shape of a pocket. At least one face of the pocket is clear and allows for dry erase of markings. A series of printed pages accompanies the pocket so that each can be inserted into the pocket. Each page includes a design which is visible when inserted into the pocket, so that it can be used to make the markings upon the pocket. When a new marking is desired, the previous marking can be wiped off and the printed page can be used to make a new marking, or a new printed page may be inserted.

In the preferred embodiment, the writing pad also includes an attachment for the marker. In addition, in the preferred embodiment the printed pages include a problem to be solved on one side and its solution on the other side.

BRIEF DESCRIPTION OF THE DRAWINGS

Other objects and advantages of the present invention will become apparent from the following description of the preferred embodiment with reference to the drawings, in which.

DETAILED DESCRIPTION OF THE PREFERRED EMBODIMENT

The interchangeable educational writing pad of the present invention generally comprises a placemat in the general shape of a pocket. In the preferred embodiment the placemat includes a holder for the writing instrument. The writing pad also includes a series of printed page inserts. In the preferred embodiment the printed page inserts have a problem printed of one side, and its solution on the other. In addition, in the preferred embodiment the printed page inserts include a tab.

Figure 1:
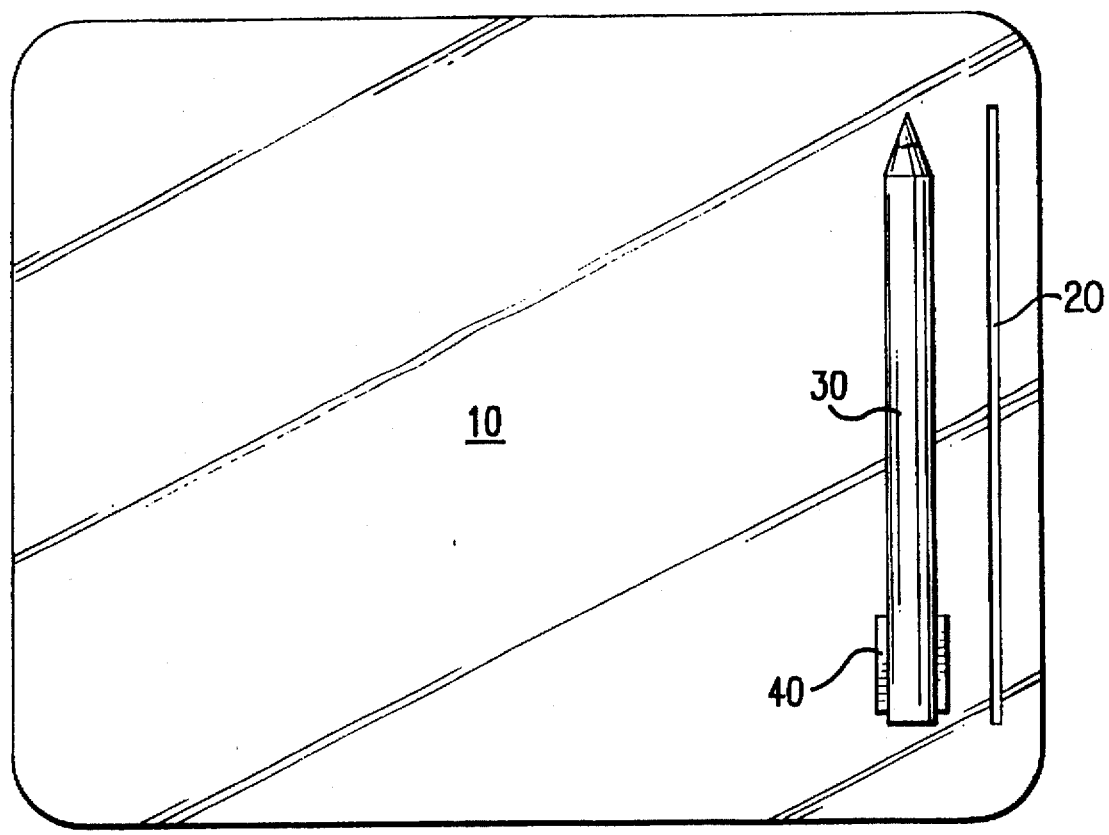
FIG. 1 is a top view of an embodiment of the interchangeable educational writing pad of the present invention.

With reference to FIG. 1, a clear plastic placemat 10 is made of two vinyl sheets connected at their periphery. The connection can be made by any conventional method, such as heat soldering or the like. The top sheet is provided with an opening 20 on the right side to thereby form a pocket. Alternatively, the opening can be made at the top, or any other side. Still, alternatively, the vinyl sheets may be connected only at three sides, thus leaving one side to serve as the pocket opening. The opening 20 allows for a printed page insert (FIG. 2) to be inserted into and removed from the placemat 10. At least the top sheet of placemat 10 comprises a clear vinyl and preferably has a silicone coating which is double polished to allow easy wiping off of markers made with a dry erase marker. It should be appreciated that other conventional techniques or materials which allow the wiping of dry erase markers can be used.

In the preferred embodiment, the marker 30 is attached to the placemat via Velcro® patch 40. Alternatively, the marker 30 may be attached to the placemat 10 by a string, a plastic loop, or other methods. The marker 30 is preferably of a dry erase type, such as, for example, Sanford® Expo® Bullet Tip dry erase marker, so that it easily glides on the surface of the placemat and easily wipes off.

Figure 2:
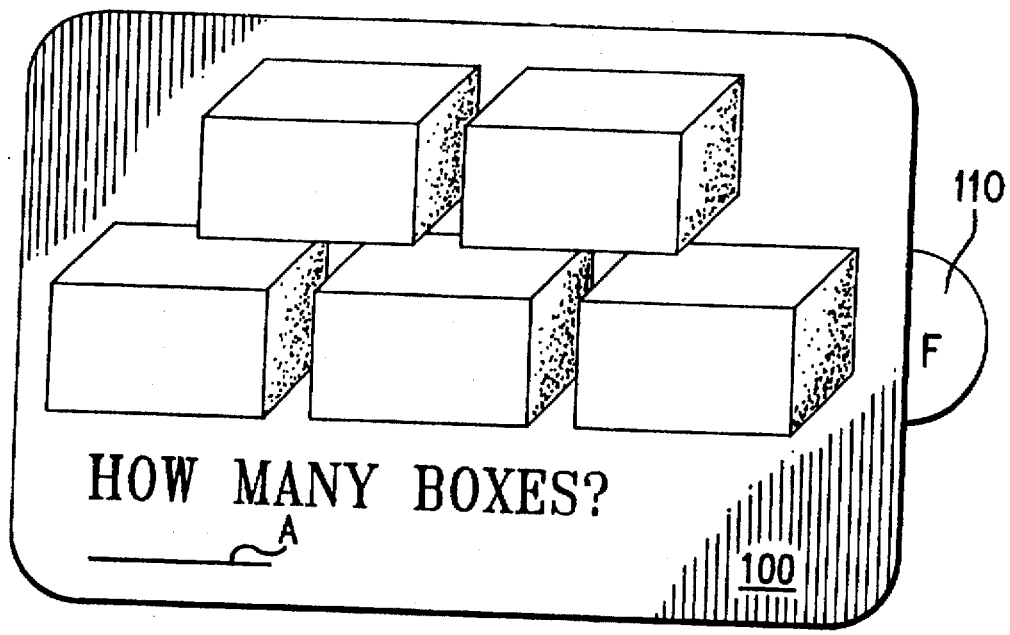
FIG. 2 is a top view of an example of a printed page insert of the interchangeable educational writing pad of the present invention.

With reference to FIG. 2, the insert 100 is preferably made of a heavy weight cardstock and preferably has a printed design on each side. In the preferred embodiment the sides are labeled with an "F" for front and a "B" for back. In addition, in the preferred embodiment the insert 100 is provided with a half circle tab 110 extending from the right side of the cardstock. It is preferable that the label "F" be printed on the tab 110 over a background color which is different from the background color on the other side of tab 110, where the label "B" is printed.

In the preferred embodiment, when the insert 100 is inserted into writing placemat 10, the tab 110 extends approximately one-half of an inch beyond the opening in the placemat, allowing the user to easily grasp the tab and remove the insert 100 from the placemat 10. The from of the insert 100, labeled "F," contains an unanswered game, puzzle, etc., for the user to answer using the dry erase marker on the plastic surface.

Figure 3:
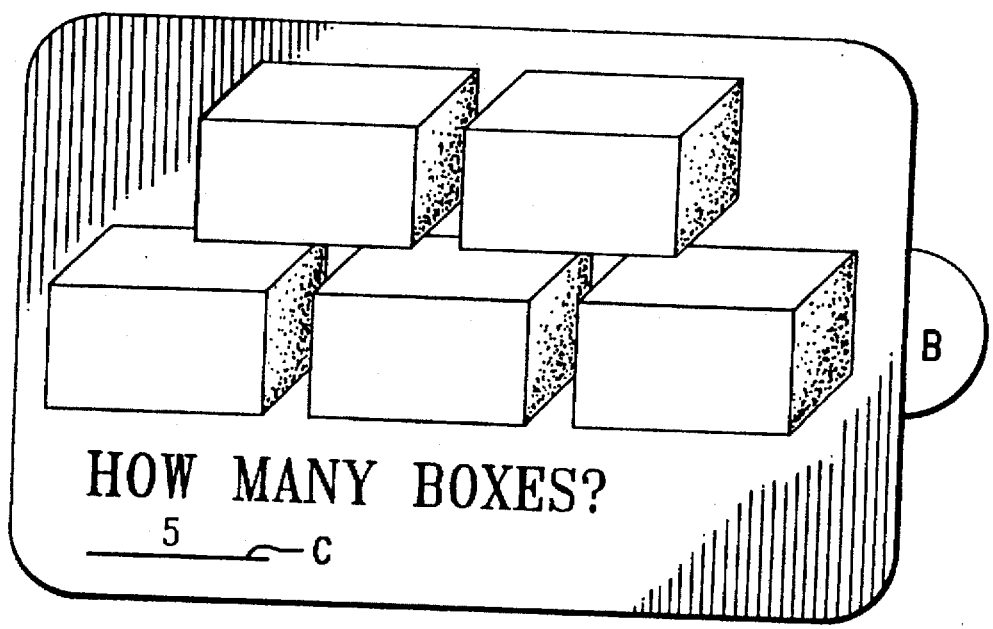
FIG. 3 is a top view of the other side of the example of a printed page insert of the interchangeable educational writing pad of the present invention shown in FIG. 2.

Once the user has answered the questions, the insert is pulled out, flipped, and re-inserted so that the back side, shown in FIG. 3, is now facing the user. The back of the insert, labeled "B," displays the same game with the correct answers given. In the preferred embodiment, the correct answer is provided in a location which is calculated to appear below the user's answer. This allows the users to check their answer against the correct answer.

More particularly, on the front of insert 100, a designated space A is provided for the user's answer. On the backside, the correct answer is provided at the space C similar to space A provided for the user's answer. Thus, when the insert 100 is inserted with the backside towards the user, the printed correct answer will appear under the user's answer.

It is preferred that several inserts 100 having different prints are provided with the writing pad of the present invention, so as to display various educational games. It is also preferred that the various inserts 100 will be grouped in different volumes according to subject, level of difficulty, or the like.

As previously mentioned, in the preferred embodiment, the writing placement 10 is provided with attachment means 40 to attach the marker 30 to the writing placement 10. This feature is provided to avoid accidental use of a marker which cannot be wiped off the clear vinyl. By providing the attachment means, the appropriate marker would be immediately associated with the marker 30, and the use of improper markers can be avoided. In addition, it should be appreciated that the attachment means could be configured to support several markers to allow use of different colors.

What is claimed is:

1. An educational writing pad comprising:

a substantially rectangular bottom sheet;

a substantially rectangular clear top sheet attached to said bottom sheet on more than one side, said top sheet allowing dry erase marker markings to be wiped off;

attaching means for removably attaching at least one dry erase marker to one of said bottom sheet and said top sheet; and a substantially rectangular printed sheet, which is independent of said top sheet and said bottom sheet, wherein said bottom sheet and said top sheet form a pocket structure for removably inserting said printed sheet therebetween;

wherein said printed material on one face provides a designated location for a user's response, and wherein an appropriate response is provided on a second face in a location corresponding to said designated location.

2. The educational writing pad of claim 1, wherein said top sheet is provided with an insert slit, and wherein said top sheet is attached to said bottom sheet on all sides.

3. The educational writing pad of claim 2, wherein said printed sheet contains printed material on both faces.

4. The educational writing pad of claim 3, wherein said printed material on one face calls for a user's response, and said printed material on the other face includes a response considered as the appropriate response as called for on said one face.

5. An educational writing pad comprising:

a substantially rectangular bottom sheet;

a substantially rectangular clear top sheet attached to said bottom sheet on at least one side, said top sheet allowing dry erase marker markings to be wiped off; and at least one substantially rectangular printed sheet, which is independent of said top sheet and said bottom sheet, for removable insertion between said bottom and said top sheets;

wherein a first side of said printed sheet includes a printed matter which calls for a user's response and a second side of said printed sheet includes a printed matter which provides a response considered as the appropriate response as called for on said first side;

wherein said printed material on said first side provides a designated location for the user's response, and wherein said appropriate response is provided on said second side in a location corresponding to said designated location.

6. The educational writing pad of claim 5, wherein said top sheet is provided with an insert slit, and wherein said top sheet is attached to said bottom sheet on all sides.

7. The educational writing pad of claim 5, wherein said printed sheet further comprises a tab.

8. The educational writing pad of claim 7, further comprising attachment means for removably attaching at least one marker to said educational writing pad.

* * * * *